US012797718B2

(12) United States Patent
Kim et al.

(10) Patent No.: US 12,797,718 B2
(45) Date of Patent: Nov. 17, 2026

(54) DISPLAY APPARATUS, SERVER APPARATUS AND CONTROL METHOD THEREOF

(71) Applicant: SAMSUNG ELECTRONICS CO., LTD., Suwon-si (KR)

(72) Inventors: Doyoung Kim, Suwon-si (KR); Hwasun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 381 days.

(21) Appl. No.: 18/387,724

(22) Filed: Nov. 7, 2023

(65) Prior Publication Data

US 2024/0181340 A1 Jun. 6, 2024

Related U.S. Application Data

(63) Continuation of application No. PCT/KR2023/013518, filed on Sep. 8, 2023.

(30) Foreign Application Priority Data

Dec. 2, 2022 (KR) ........................ 10-2022-0166748

(51) Int. Cl.
*A63F 13/355* (2014.01)
*A63F 13/25* (2014.01)

(52) U.S. Cl.
CPC ............ *A63F 13/355* (2014.09); *A63F 13/25* (2014.09)

(58) Field of Classification Search
CPC ....... A63F 13/355; A63F 13/25; H04N 21/24; H04N 21/2662; H04N 21/462; H04N 21/2402; H04N 21/4621
See application file for complete search history.

(56) References Cited

U.S. PATENT DOCUMENTS

| | | | | |
|---|---|---|---|---|
| 7,671,873 | B1 * | 3/2010 | Pierini ...................... | G06F 3/14 345/603 |
| 8,631,451 | B2 | 1/2014 | Bennett et al. | |

(Continued)

FOREIGN PATENT DOCUMENTS

| | | | |
|---|---|---|---|
| EP | 3 903 896 | A1 | 11/2021 |
| JP | 2022-172980 | A | 11/2022 |

(Continued)

OTHER PUBLICATIONS

International Search Report (PCT/ISA/210) issued Dec. 26, 2023 by the International Searching Authority in International Patent Application No. PCT/KR2023/013518.

(Continued)

*Primary Examiner* — Seng H Lim
(74) *Attorney, Agent, or Firm* — Sughrue Mion, PLLC

(57) ABSTRACT

Provided is a display apparatus configured to display a variable frequency image. The display apparatus includes: a communication interface; a display; a memory; and at least one processor. The display apparatus is configured to: transmit, through the communication interface, available range information to an external server, the available range information comprising a minimum refresh rate and a maximum refresh rate of a variable refresh rate (VRR), receive content from the external server, through the communication interface, the content comprising a variable frequency image rendered based on the available range information, network bandwidth information, and variable frame rate information that corresponds to the variable frequency image, and control, based on the received content, the display to display the variable frequency image based on the variable frame rate information.

18 Claims, 10 Drawing Sheets

(56) References Cited

U.S. PATENT DOCUMENTS

| | | | | |
|---|---|---|---|---|
| 8,968,080 | B1 * | 3/2015 | Anderson | G07F 17/323 463/25 |
| 10,229,651 | B2 * | 3/2019 | Cook | G09G 5/006 |
| 10,376,786 | B2 | 8/2019 | Lee et al. | |
| 10,491,666 | B2 * | 11/2019 | Colenbrander | A63F 13/35 |
| 11,025,858 | B2 | 6/2021 | Zheng et al. | |
| 11,185,772 | B2 | 11/2021 | Lee et al. | |
| 11,431,942 | B2 | 8/2022 | Zheng et al. | |
| 2009/0066704 | A1 * | 3/2009 | Daniel | G09G 5/006 370/208 |
| 2012/0163188 | A1 | 6/2012 | Kobayashi | |
| 2014/0189091 | A1 | 7/2014 | Tamasi et al. | |
| 2016/0078846 | A1 * | 3/2016 | Liu | G09G 5/18 345/212 |
| 2016/0275905 | A1 * | 9/2016 | Sacchetto | G09G 5/006 |
| 2017/0182416 | A1 | 6/2017 | Lee et al. | |
| 2017/0352323 | A1 * | 12/2017 | Spence | G09G 5/36 |
| 2018/0167449 | A1 * | 6/2018 | Zhu | H04L 67/1001 |
| 2019/0156785 | A1 * | 5/2019 | Marchya | G09G 3/2096 |
| 2019/0164518 | A1 * | 5/2019 | Dimitrov | G02B 27/017 |
| 2019/0344176 | A1 | 11/2019 | Lee et al. | |
| 2020/0195541 | A1 * | 6/2020 | Tamasi | H04L 65/80 |
| 2020/0374242 | A1 | 11/2020 | Xu et al. | |
| 2020/0376375 | A1 * | 12/2020 | Chen | A63F 13/211 |
| 2021/0044777 | A1 | 2/2021 | Zheng et al. | |
| 2021/0093956 | A1 * | 4/2021 | Cerny | A63F 13/355 |
| 2021/0093961 | A1 | 4/2021 | Colenbrander et al. | |
| 2021/0093962 | A1 | 4/2021 | Colenbrander et al. | |
| 2021/0250545 | A1 | 8/2021 | Zheng et al. | |
| 2021/0280156 | A1 * | 9/2021 | Mehta | G09G 5/10 |
| 2021/0339130 | A1 * | 11/2021 | Sameer Kalathil | H04N 21/6582 |
| 2022/0054938 | A1 | 2/2022 | Lee et al. | |
| 2022/0303633 | A1 | 9/2022 | Sprenger et al. | |
| 2022/0358897 | A1 | 11/2022 | Sato | |
| 2022/0379204 | A1 | 12/2022 | Zhao et al. | |
| 2022/0408056 | A1 | 12/2022 | Zheng et al. | |
| 2023/0115947 | A1 * | 4/2023 | Cerny | A63F 13/355 463/31 |
| 2023/0206884 | A1 * | 6/2023 | Lambord | G09G 5/393 345/156 |
| 2023/0335037 | A1 | 10/2023 | Kim et al. | |
| 2024/0066397 | A1 * | 2/2024 | Rivas | A63F 13/355 |
| 2024/0430500 | A1 * | 12/2024 | Velasco | H04N 21/234381 |

FOREIGN PATENT DOCUMENTS

| | | | |
|---|---|---|---|
| KR | 10-1725066 | B1 | 4/2017 |
| KR | 10-2017-0076478 | A | 7/2017 |
| KR | 10-2332050 | B1 | 11/2021 |
| KR | 10-2022-0044491 | A | 4/2022 |
| KR | 10-2022-0116966 | A | 8/2022 |

OTHER PUBLICATIONS

Written Opinion (PCT/ISA/237) issued Dec. 26, 2023 by the International Searching Authority in International Patent Application No. PCT/KR2023/013518.

Communication issued Aug. 29, 2025 by the European Patent Office in European Patent Application No. 23898013.0.

Communication dated May 29, 2026, issued by the European Patent Office in European Application No. 23898013.0.

* cited by examiner

DISPLAY APPARATUS, SERVER APPARATUS AND CONTROL METHOD THEREOF

CROSS-REFERENCE TO RELATED APPLICATION(S)

This application is a bypass continuation of International Application No. PCT/KR2023/013518, filed on Sep. 8, 2023, which is based on and claims priority to Korean Patent Application No. 10-2022-0166748, filed on Dec. 2, 2022, in the Korean Intellectual Property Office, the disclosures of which are incorporated by reference herein in their entireties.

BACKGROUND

1. Field

The disclosure relates to a display apparatus, a server apparatus, and a control method, and more particularly, to a display apparatus that receives streaming content, a server apparatus that streams content, and a control method thereof.

2. Description of the Related Art

Broadcasting and an over-the-top (OTT), a cloud game, a mirroring server, and the like are services that transfer compressed image streams from a server system (e.g., that performs a role of a server) to a client system for displaying to a user. A client may receive data and demands from the user and transmit the same to a server, and the server may provide a service matching the received user data.

For example, in a case of a cloud gaming service, it may be possible to provide a game service without being largely affected by a capability of a client system (e.g., performance of a central processing unit (CPU), graphics processing unit (GPU), etc. Accordingly, a multi-platform service in various terminals such as, for example, and without limitation, a television (TV), a smartphone, and the like, in addition to a personal computer (PC) may be possible. However, providing such a multi-platform service may be limited by factors, such as, for example, internet speed, network quality, server processing speed, transmission/processing delays, etc. There is a need for technology such as enhancements in internet speed and network quality, an enhancement in server processing speed, a minimization of delay time, and the like.

SUMMARY

According to an aspect of the disclosure, a display apparatus includes: a communication interface; a display; a memory storing at least one instruction; and at least one processor operatively connected with the communication interface, the display, and the memory. The least one processor is configured to execute the at least one instruction to: transmit, through the communication interface, available range information to an external server, the available range information comprising a minimum refresh rate and a maximum refresh rate of a variable refresh rate (VRR), receive, through the communication interface, content from the external server, the content comprising a variable frequency image rendered based on the available range information, network bandwidth information, and variable frame rate information that corresponds to the variable frequency image, and control, based on the received content, the display to display the variable frequency image based on the variable frame rate information.

The at least one processor may be further configured to execute the at least one instruction to: control the display to be set in a VRR output mode based on an info frame in the received content.

The at least one processor may be further configured to execute the at least one instruction to: identify at least one of the minimum refresh rate or the maximum refresh rate needing change, based on at least one of a stream buffer state or a network state; and transmit adjusted available range information to the external server, the adjusted available range information comprising at least one of a changed minimum refresh rate or a changed maximum refresh rate.

The external server may be configured to provide a cloud gaming service, and the at least one processor may be further configured to execute the at least one instruction to: transmit a request for a game content to the external server; receive a signal verifying VRR operability, from the external server, based on the request for the game content; and transmit the available range information to the external server based on the signal verifying VRR operability.

According to an aspect of the disclosure, a server apparatus includes: a communication interface; a memory storing at least one instruction; and at least one processor operatively connected with the communication interface and the memory. The at least one processor is configured to execute the at least one instruction to: receive, through the communication interface, available range information from a client apparatus, the available range information comprising a minimum refresh rate and a maximum refresh rate of a variable refresh rate (VRR), render a variable frequency image based on the available range information and network bandwidth information, and transmit content to the client apparatus, through the communication interface, the content comprising the rendered variable frequency image, and variable frame rate information corresponding to the variable frequency image.

The at least one processor may be further configured to execute the at least one instruction to: identify a resolution to render the variable frequency image, based on the network bandwidth information; identify a frame rate to render the variable frequency image, based on the available range information; and render the variable frequency image based on the identified resolution and the identified frame rate.

The at least one processor may be further configured to execute the at least one instruction to: render the variable frequency image by varying the frame rate while maintaining the resolution, based on the network bandwidth information.

The at least one processor may be further configured to execute the at least one instruction to: identify a frame rate of the variable frequency image within an available range comprising the minimum refresh rate and the maximum refresh rate of VRR, based on a frequency of a user control command received from the client apparatus.

The server apparatus may be configured to provide a cloud gaming service, and the at least on processor may be further configured to execute the at least one instruction to: receive, from the client apparatus, a request for a game content; transmit, to the client apparatus, a signal verifying VRR operability based on the request for the game content; receive available range information from the client apparatus, based on the signal verifying VRR operability.

According to an aspect of the disclosure, a method of controlling a display apparatus includes: transmitting available range information to an external server, the available range information comprising a minimum refresh rate and a maximum refresh rate of a variable refresh rate (VRR);

receiving content from the external server, the content comprising a variable frequency image rendered based on the available range information, network bandwidth information, and variable frame rate information that corresponds to the variable frequency image; and outputting the variable frequency image on a display, based on the variable frame rate information.

The method of controlling the display apparatus may further include: setting the display to a VRR output mode based on an info frame in the received content.

The method of controlling the display apparatus may further include: identifying whether at least one of the minimum refresh rate or the maximum refresh rate needs to be changed, based on at least one of a stream buffer state or a network state; and transmitting adjusted available range information to the external server, based on identifying that at least one of the minimum refresh rate or the maximum refresh rate needs to be changed, the adjusted available range information comprising at least one of a change minimum refresh rate and a changed maximum refresh rate.

The external server may be configured to provide a cloud gaming service, and the transmitting the adjusted available range information to the external server may include: transmitting a request for a game content to the external server; receiving a signal verifying VRR operability from the external server, based on the request for the game content; transmitting the adjusted available range information to the external server, based on the signal verifying VRR operability.

According to an aspect of the disclosure, a method of controlling a server apparatus includes: receiving available range information from a client apparatus, the available range information comprising a minimum refresh rate and a maximum refresh rate of a variable refresh rate (VRR); rendering a variable frequency image based on the available range information and network bandwidth information; and transmitting content to the client apparatus, the content comprising the rendered variable frequency image and variable frame rate information corresponding to the variable frequency image.

The method of controlling the server apparatus may further include: identifying a resolution to render the variable frequency image, based on the network bandwidth information; identifying a frame rate to render the variable frequency image, based on the available range information; and rendering the variable frequency image based on the identified resolution and the identified frame rate.

The method of controlling the server apparatus may further include: rendering the variable frequency image by varying the frame rate while maintaining the resolution, based on the network bandwidth information.

The method of controlling the server apparatus may further include: receiving, from the client apparatus, a request for a game content; transmitting, to the client apparatus, a signal verifying VRR operability based on the request for the game content; and receiving available range information from the client apparatus, based on the signal verifying VRR operability.

The method of controlling the server apparatus may further include: receiving, from the client apparatus, adjusted available range information, the adjusted available range information comprising at least one of a changed minimum refresh rate or a changed maximum refresh rate of the VRR; and rendering the variable frequency image based on the adjusted available range information and the network bandwidth information, wherein the variable frequency image is rendered in a first frequency at a first time based on the available range information and the network information, and the variable frequency image is rendered in a second frequency at a second time based on the adjusted available range information and the network information.

The at least one processor may be further configured to execute the at least on instruction to: control the display to display the variable frequency image in a first frequency at a first time, based on the variable frame rate information; and control the display to display the variable frequency image in a second frequency at a second time, based on the variable frame rate information.

According to an aspect of the disclosure, a non-transitory computer readable medium stores computer readable program code or instructions which are executable by a processor to perform a method for controlling a server apparatus. The method includes: receiving available range information from a client apparatus, the available range information comprising a minimum refresh rate and a maximum refresh rate of a variable refresh rate (VRR); rendering a variable frequency image based on the available range information and network bandwidth information; and transmitting content to the client apparatus, the content comprising the rendered variable frequency image and variable frame rate information corresponding to the variable frequency image.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
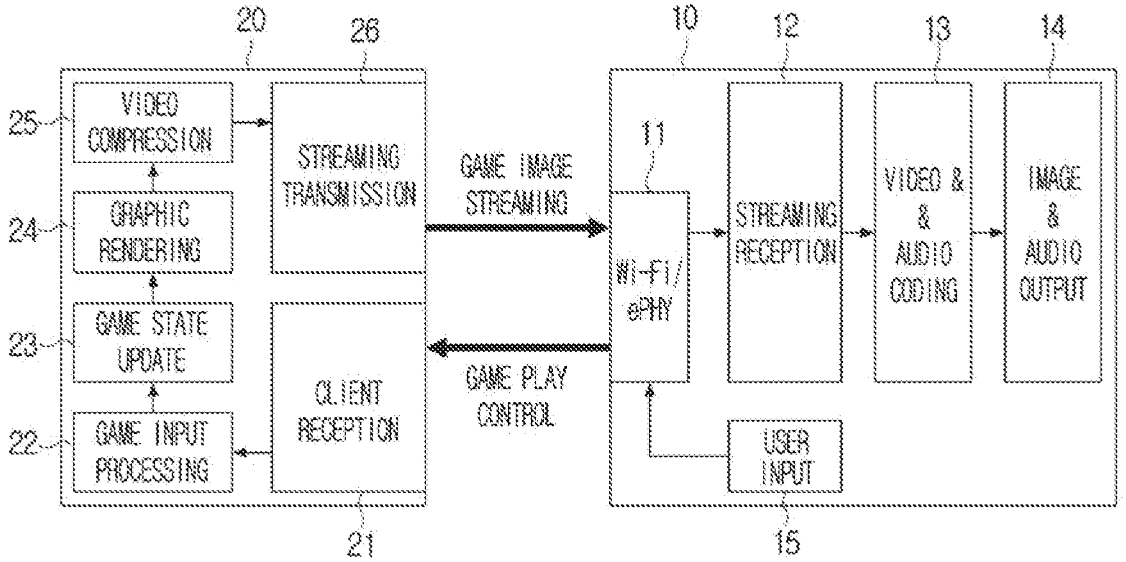
FIG. 1 is a diagram schematically illustrating a real-time image streaming system according to one or more embodiments.

Terms used in the disclosure will be briefly described, and the disclosure will be described in detail.

The terms used in the disclosure are general terms that are widely used considering their function herein. However, the terms may change depending on intention, legal or technical interpretation, emergence of new technologies, and the like of those skilled in the related art. In certain cases, there may be terms arbitrarily selected, and in this case, the meaning of the term will be disclosed in greater detail in the corresponding description. Accordingly, the terms in the present disclosure are used merely to describe a specific embodiment, and it is to be understood that the terms are not intended to limit the scope of the disclosure.

In the disclosure, expressions such as “have,” “may have,” “include,” “may include,” or the like are used to designate a presence of a corresponding characteristic (e.g., elements such as numerical value, function, operation, or component), and not to preclude a presence or a possibility of additional characteristics.

In the disclosure, expressions such as “A or B,” “at least one of A and/or B,” or “one or more of A and/or B” may include all possible combinations of the items listed together. For example, “A or B,” “at least one of A and B,” or “at least one of A or B” may refer to all cases including (1) only A, (2) only B, or (3) both A and B.

Expressions such as “first,” “second,” “1st,” “2nd,” and so on used herein may be used to refer to various elements regardless of order and/or importance. Further, it should be noted that the expressions are merely used to distinguish an element from another element and not to limit the relevant elements.

When a certain element (e.g., first element) is indicated as being “operatively or communicatively coupled with/to” or “connected to” another element (e.g., second element), it may be understood as the certain element being directly coupled with/to the another element or as being coupled through other element (e.g., third element).

The expression “configured to . . . ” (or set up to) used in the disclosure may be used interchangeably with, for example, “suitable for . . . ,” “having the capacity to . . . ,” “designed to . . . ,” “adapted to . . . ,” “made to . . . ,” or “capable of . . . ” based on circumstance. The term “configured to . . . ” (or set up to) may not necessarily mean “specifically designed to” in terms of hardware.

In a certain circumstance, the expression “a device configured to . . . ” may mean something that the device “may perform . . . ” together with another device or components. For example, the phrase “a processor configured to (or set up to) perform A, B, or C” may mean a dedicated processor for performing a corresponding operation (e.g., embedded processor), or a generic-purpose processor (e.g., a central processing unit (CPU) or an application processor) capable of performing the corresponding operations by executing one or more software programs stored in the memory device.

A singular expression includes a plural expression, unless otherwise specified. It is to be understood that the terms such as “form” or “include” are used herein to designate a presence of a characteristic, number, step, operation, element, component, or a combination thereof, and not to preclude a presence or a possibility of adding one or more of other characteristics, numbers, steps, operations, elements, components or a combination thereof.

The term “module” or “part” used in one or more embodiments herein perform at least one function or operation, and may be implemented with a hardware or software, or implemented with a combination of hardware and software. Further, a plurality of “modules” or a plurality of “parts,” except for a “module” or a “part” which needs to be implemented to a specific hardware, may be integrated to at least one module and implemented in at least one processor.

The various elements and areas of the drawings have been schematically illustrated. Accordingly, the technical spirit of the disclosure is not limited by relative sizes and distances illustrated in the accompanied drawings.

Hereinafter, embodiments of the present disclosure will be described in detail with reference to the accompanying drawings, where similar reference characters denote corresponding features consistently throughout.

FIG. 1 is a diagram schematically illustrating a real-time image streaming system according to one or more embodiments of the disclosure.

According to the embodiment shown in FIG. 1, the real-time image streaming system may include a client apparatus 10 and a server apparatus 20.

In order to perform streaming of high-definition and high-resolution images such as 4K and 8K through a network, an image encoding technique and up/down scaling which can reduce a network request bandwidth may be important. With the image encoding technique, a standard codec such as H.264/265, VP8/9, and AV1 is widely used, and an OTT provider may provide a service by compressing a 4K image with H.265 up to about 15 Mbps. In order to service every user according to different network environments from one another, it is necessary to compress the image to image resolutions and transmission rates of various combinations, and a technique used at this time may be an up/down scaling technique. For example, when trying to transmit an 8K image at a level of about 15 Mbps, the server apparatus 20 may perform downscaling of an image, perform encoding of the downscaled image, and transmit to the client apparatus 10. The client apparatus 10 may perform decoding of the image received from the server apparatus 20 and display the decoded image. In addition, the client apparatus 10 may perform upscaling of the decoded image if necessary and display the image.

In case of a real-time image streaming service, the server apparatus 20 may perform downscaling and encoding of an image in real-time based on a resolution and/or a compression bitrate selected in real-time. For example, the real-time image streaming service may include a cloud gaming service, a live broadcast service, a mirroring service, a video communication server, and the like.

In an embodiment, if the cloud gaming service is provided, the server apparatus 20 may perform streaming of a game image and audio to the client apparatus 10 as shown in FIG. 1. The client apparatus 10 may perform, based on the game image being received streaming 12 through a communication function 11, video/audio decoding 13 of the received game image and audio and output 14 through a display and a speaker. The client apparatus 10 may transmit, based on a user input being received, a game play control signal corresponding to the received user input to the server apparatus 20.

The server apparatus 20 may perform game input processing 22 based on the game play control signal received from the client apparatus 10 through a client receiving function 21 and update a game state 23 based on the processed game input. In addition, the server apparatus 20 may perform a graphic rendering 24 of the game image based on the updated game state and perform a video compression 25 (and audio compression) of the rendered image. In addition, the server apparatus 20 may transmit a video compressed image (and audio compressed audio) to the client apparatus 10 through a streaming transmission function 26.

According to an embodiment, with the cloud gaming service described above, a content with a high scan rate of greater than or equal to 60 Hz may be preferred, but it may lead to a drop in gaming performance due to a delay in input by the user in a deteriorating situation such as a load in the server apparatus 20, a temporary transmission failure of a network, or a decrease in bandwidth.

Accordingly, various embodiments for minimizing transmission delay while maintaining quality according to a network state and/or a characteristic of the client apparatus in a low-latency streaming service such as the cloud gaming service will be described below.

Figure 2A:
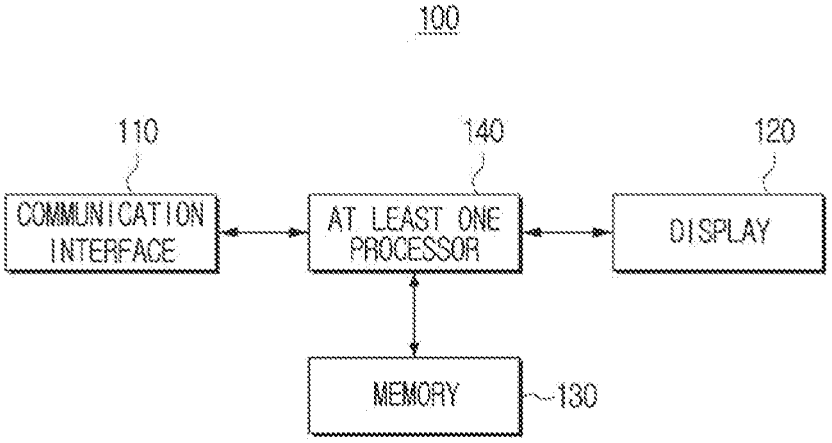
FIG. 2A is a block diagram illustrating a configuration of a display apparatus according to one or more embodiments.

FIG. 2A is a block diagram illustrating a configuration of a display apparatus according to one or more embodiments.

Referring to FIG. 2A, a display apparatus 100 may include a communication interface 110, a display 120, a memory 130, and at least one processor 140.

According to an embodiment, the communication interface 110 may support various communication methods. For example, the communication interface 110 may perform communication with an external apparatus, an external storage medium (e.g., universal serial bus (USB) memory), an external server (e.g., cloud server), and the like through communication methods such as for example, and without limitation, Bluetooth, an AP based Wi-Fi (e.g., Wi-Fi, wireless LAN network), ZigBee, a wired/wireless local area network (LAN), a wide area network (WAN), Ethernet, IEEE 1394, a high-definition multimedia interface (HDMI), a USB, a mobile high-definition link (MHL), Audio Engineering Society/European Broadcasting Union (AES/EBU), Optical, Coaxial, or the like.

The display 120 may be implemented as a display including a self-emissive device or a display including a non-emissive device and a backlight. The display 120 may be implemented as a display of various forms such as, for example, and without limitation, a liquid crystal display (LCD), an organic light emitting diode (OLED) display, a light emitting diode (LED), a micro LED, a mini LED, a plasma display panel (PDP), a quantum dot (QD) display, a quantum dot light emitting diode (QLED), and the like. In the display 120, a driving circuit, which may be implemented in the form of an a-si thin film transistor (TFT), a low temperature poly silicon (LTPS) TFT, an organic TFT (OTFT), or the like, a backlight unit, and the like may be included. In an embodiment, a front surface of the display 120 may be disposed with a touch sensor that detects a touch operation in a form such as, for example, and without limitation, a touch film, a touch sheet, a touch pad, and the like and implemented so as to detect a touch input of various types. For example, the display 120 may detect a touch input of various types such as, for example, and without limitation, a touch input by a user hand, a touch input by an input device such as a stylus pen, a touch input by a specific electrostatic material, and the like. Here, the input device may be implemented as an input device in pen form which can be referred to in various terms such as, for example, and without limitation, an electronic pen, a stylus pen, a S-pen, and the like. In an embodiment, the display 120 may be implemented as a flat display, a curved display, a foldable and/or rollable flexible display, and the like.

The memory 130 may store data necessary for the various embodiments. The memory 130 may be implemented in a memory form embedded to a display apparatus 100' according to data storage use, or implemented in a memory form attachable to or detachable from the display apparatus 100. For example, data for driving the display apparatus 100 may be stored in a memory embedded to the display apparatus 100', and data for an expansion function of the display apparatus 100 may be stored in a memory attachable to or detachable from the display apparatus 100. According to an embodiment, the memory embedded to the display apparatus 100 may be implemented as at least one from among a volatile memory (e.g., a dynamic RAM (DRAM), a static RAM (SRAM), or a synchronous dynamic RAM (SDRAM)), or a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)). In addition, the memory attachable to or detachable from the display apparatus 100 may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

The at least one processor 140 may control an overall operation of the display apparatus 100. Specifically, the at least one processor 140 may control the overall operation of the display apparatus 100 by being connected with each configuration of the display apparatus 100. For example, the at least one processor 140 may control the overall operation of the display apparatus 100 by being electrically connected with the display 120 and the memory 130. The at least one processor 140 may be formed as one or a plurality of processors.

The at least one processor 140 may perform an operation of the display apparatus 100 according to various embodiments by executing at least one instruction stored in the memory 130.

The at least one processor 140 may include at least one from among a central processing unit (CPU), a graphics processing unit (GPU), an accelerated processing unit (APU), a many integrated core (MIC), a neural processing unit (NPU), a hardware accelerator, or a machine learning accelerator. The at least one processor 140 may control one or a random combination from among other elements of the display apparatus, and perform an operation associated with communication or data processing. The at least one processor 140 may execute at least one program or instruction stored in the memory. For example, the at least one processor may perform, by executing at least one instruction stored in the memory, a method according to one or more embodiments of the disclosure.

When a method according to one or more embodiments of the disclosure includes a plurality of operations, the plurality of operations may be performed by one processor, or performed by a plurality of processors. For example, when a first operation, a second operation, and a third operation are performed by a method according to one or more embodiments, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor).

The at least one processor 140 may be implemented as a single core processor that includes one core, or as at least one multicore processor that includes a plurality of cores (e.g., a homogeneous multicore or a heterogeneous multicore). If the at least one processor 140 is implemented as a multicore processor, each of the cores included in the multicore processor may include a memory inside the processor such as a cache memory and an on-chip memory, and a common cache shared by the plurality of cores may be included in the multicore processor. In addition, each of the plurality of cores (or a portion from among the plurality of cores) included in the multicore processor may independently read and perform a program command for implementing a method according to one or more embodiments, or read and perform a program command for implementing a method according to one or more embodiments of the disclosure due to a whole (or a portion) of the plurality of cores being interconnected.

When a method according to one or more embodiments of the disclosure include a plurality of operations, the plurality of operations may be performed by one core from among the plurality of cores or performed by the plurality of cores included in the multicore processor. For example, when a first operation, a second operation, and a third operation are performed by a method according to one or more embodiments, the first operation, the second operation, and the third operation may all be performed by a first core included in the multicore processor, or the first operation and the second operation may be performed by the first core included in the multicore processor and the third operation may be performed by a second core included in the multicore processor.

According to one or more embodiments, a processor may refer to a system on chip (SoC) in which the at least one processor and other electronic components are integrated, a single core processor, or a multicore processor, or a core included in the single core processor or the multicore processor, and the core herein may be implemented as the CPU, the GPU, the APU, the MIC, the NPU, the hardware accelerator, the machine learning accelerator, or the like, but is not limited to the embodiments of the disclosure. For convenience of description, the at least one processor 140 may be referred to as a processor 140 below.

Figure 2B:
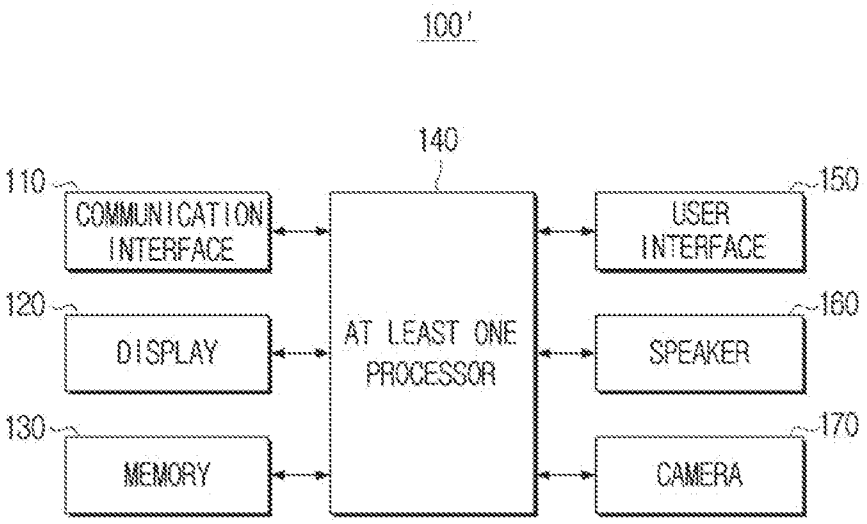
FIG. 2B is a block diagram illustrating in detail a configuration of a display apparatus according to one or more embodiments.

FIG. 2B is a block diagram illustrating in detail a configuration of a display apparatus according to one or more embodiments.

Referring to FIG. 2B, the display apparatus 100' may include the communication interface 110, the display 120, the memory 130, the at least one processor 140, a user interface 150, a speaker 160, and a camera 170. Detailed descriptions of configurations that overlap with the configurations shown in FIG. 2A from among the configurations shown in FIG. 2B will be omitted.

The user interface 150 may be implemented with a device such as a button, a touch pad, a mouse and a keyboard, or implemented as a touch screen capable of performing the above-described display function and an operation input function together therewith.

The speaker 160 may be a configuration that outputs not only various audio data, but also various notification sounds, voice messages, or the like. The processor 140 may control the speaker to output information corresponding to a user interface (UI) screen or various notifications according to the various embodiments of the disclosure in audio form.

The camera 170 may be turned-on according to a pre-set event and perform capturing. The camera 170 may convert a captured image into an electric signal and generate image data based on the converted signal. For example, a subject may be converted into an electric image signal through a semiconductor charge coupled device (CCD), and the converted image signal as described above may be signal processed after being amplified and converted into a digital signal.

In an embodiment, the display apparatus 100' may include a microphone, a sensor, a tuner, a demodulator, and the like.

The microphone may be a configuration for receiving input of a user voice or other sounds and converting into audio data. However, the display apparatus 100' according to another embodiment may receive the user voice input through an external apparatus through the communication interface 110.

The sensor may include sensors of various types such as, for example, and without limitation, a touch sensor, a proximity sensor, an acceleration sensor, a geomagnetic sensor, a gryro sensor, a pressure sensor, a position sensor, an illuminance sensor, and the like.

The tuner may receive a radio frequency (RF) broadcast signal by tuning a channel selected by a user from among the RF broadcast signals received through an antenna or all pre-stored channels.

The demodulator may receive a digital intermediate frequency (IF) signal converted from the tuner and perform demodulation, channel decoding, and the like.

Figure 2C:
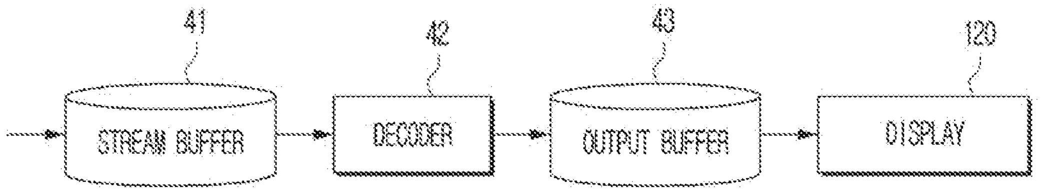
FIG. 2C is a diagram illustrating contents processing method of a display apparatus according to one or more embodiments

FIG. 2C is a diagram illustrating a content processing method of a display apparatus according to one or more embodiments.

Referring to FIG. 2C, a content being streamed in real-time to the display apparatus 100 may be stored in a stream buffer 41 (or a receive buffer). Here, the content being streamed may be content that is encoded from an external server (server apparatus 20, FIG. 1). Accordingly, the content stored in the stream buffer 41 may be provided to a decoder 42 and decoded, and the decoded content may be output through the display 120 while being buffered in an output buffer 43. Here, the decoder 42 may be implemented in a type of DSP form.

Figure 3:
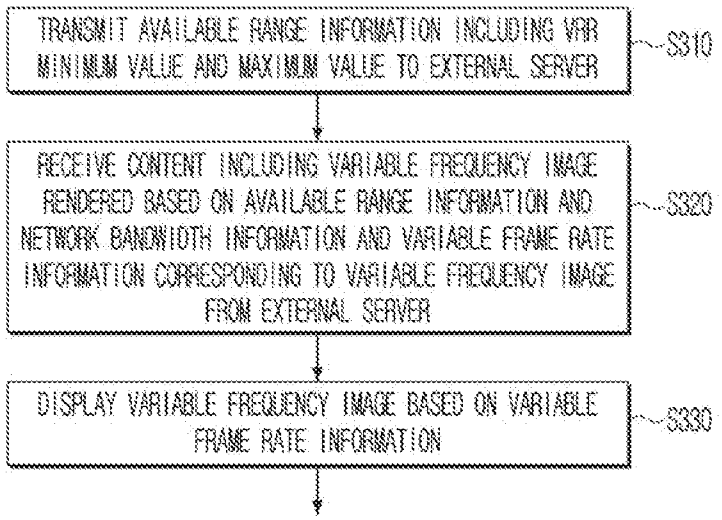
FIG. 3 is a diagram illustrating a control method of a display apparatus according to one or more embodiments.

FIG. 3 is a diagram illustrating a control method of a display apparatus according to one or more embodiments.

Referring to FIG. 3, at operation S310, the processor 140 may transmit variable refresh rate (VRR) available range information to an external server. The VRR available range information may include at least one from among a minimum value and a maximum value of VRR. For example, the VRR available range information may include both the minimum value and the maximum value of VRR. In an embodiment, the minimum value and the maximum value of VRR may be a value pre-set according to a panel characteristic of the display 120. However, the above is not limited thereto, and may be a value modified/changed according to a network state at a time of transmission. According to an embodiment, if only the minimum value (or the maximum value) is included in the VRR available range information, the external server may identify the VRR available range information of the display apparatus 100 by applying a pre-defined value with respect to the maximum value (or the minimum value).

The external server may provide a cloud gaming service. According to an example, the processor 140 may transmit a game service request that is, a game content request to the external server according to a user command, and transmit, based on a signal verifying VRR operability being received from the external server, an available range information to the external server. However, the above is not limited thereto and the available range information may be transmitted to the external server together with the game content request, or the available range information may be transmitted to the external server even if a separate signal verifying VRR operability is not received after the game content request.

At operation S320, the processor 140 may receive a variable frequency image rendered based on available range information and network bandwidth information and content including frame rate information corresponding to the variable frequency image from the external server. For example, the frame rate information may be included in metadata, but is not necessarily limited thereto.

In an embodiment, the processor 140 may control, based on the variable frequency image being identified as to be transmitted from the external server, the display 120 so as to be set in a VRR output mode. For example, the processor 140 may identify a transmission of the variable frequency image based on information included in an info frame included in content received from the external server, and control the display 120 so as to be set in the VRR output mode. For example, the info frame may include information showing that the variable frequency image can be transmitted, and that the variable frequency image can be transmitted through a portion area of the image frame.

In an embodiment, the display apparatus 100 may be implemented to support a plurality of output modes such as, for example, a VRR output mode, a frame rate control (FRC) output mode, and a normal output mode. In this case, the processor 140 may control, based on the variable frequency image being identified as to be transmitted from the external server, the display 120 so as to be set in the VRR output mode from among the plurality of output modes.

At operation S330, the processor 140 may control the display 120 to display the variable frequency image based on variable frame rate information. Here, the variable frame rate information may be included in the above-described info frame, or included in a header of a transmission packet. For example, because an image resolution and frame rate can be changed to at least one frame unit, the processor 140 may be required to acknowledge the transmitted resolution of the image and frame rate. Specifically, the processor 140 may obtain, based on an input image in a packet form being received, resolution information and frame rate included in a header area by depacketizing a packet, and obtain an encoded image included in a payload area. Alternatively, the processor 140 may obtain resolution information of an image in a decoding process.

In an embodiment, the processor 140 may obtain an output image by image processing a received image. The image processing may involve the received image being digital image processed which includes at least one from among an image enhancement, an image restoration, an image transformation, an image analysis, an image understanding, or an image compression. If the input image is a compressed image, the processor 140 may perform image processing after decoding the compressed image.

Figure 4:
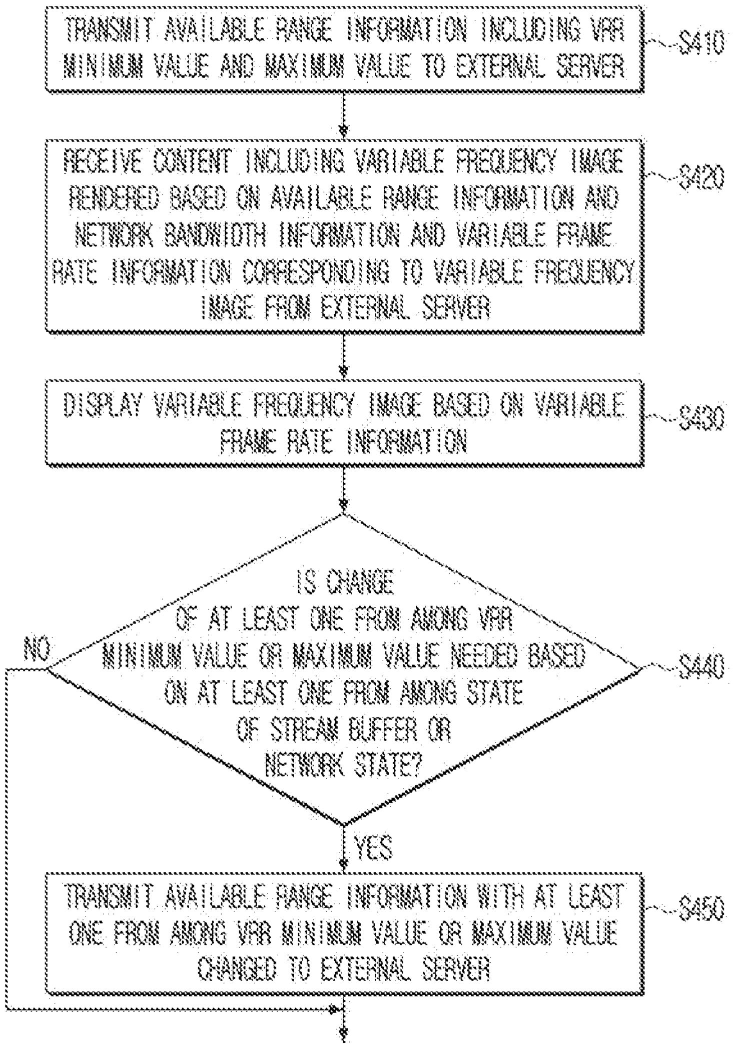
FIG. 4 is a diagram illustrating a control method of a display apparatus according to one or more embodiments.

FIG. 4 is a diagram illustrating a control method of a display apparatus according to one or more embodiments.

Referring to FIG. 4, at operation S410, the processor 140 may transmit the available range information including the minimum value and the maximum value of VRR to the external server. Operation S410 may be same or similar with operation S310 shown in FIG. 3.

At operation S420, the processor 140 may receive content including variable frequency image rendered based on the available range information and the network bandwidth information and the variable frame rate information corresponding to the variable frequency image from the external server. Operation S420 may be same or similar with operation S320 shown in FIG. 3.

At operation S430, the processor 140 may control the display 120 to display the variable frequency image based on variable frame rate information. Operation S430 may be same or similar with operation S330 shown in FIG. 3.

At operation S440, the processor 140 may identify whether at least one from among the minimum value or the maximum value of VRR needs to be changed based on at least one from among a state of the stream buffer or the network state.

For example, the processor 140 may identify whether at least one from among the minimum value or the maximum value of VRR needs to be changed based on the network state. Here, network state information may include at least one from among an available bandwidth of a network, a packet loss rate, a round-trip time of a packet, a delay-gradient of a packet, received signal strength indicator (RSSI) information, communication channel information, link speed information, channel interference information, or retry rate information. That is, the network state information may be information associated with various networks that are affected according to congestion, distance, and transmission rate of the network. The round-trip time (or round trip delay) of the packet may refer to time taken for a packet to take a round-trip from the network to a receiving end. The delay-gradient of the packet may be a difference between a transmission time interval of the packets transmitted from a transmitting end and a receiving time interval of the packets received from the receiving end. The communication channel information may include information about at least one from among a channel and a frequency. The link speed information may be information about a rate of packets transmitted from the transmitting end to the receiving end. The channel interference information may be obtained based on an interference factor of each channel measured using various channel RF parameters such as a channel active time, a channel busy time, and a channel transmit time. The retry rate information may show a percentage of transmission packets being retried on a second basis.

For example, the processor 140 may identify whether at least one from among the minimum value or the maximum value of VRR needs to be changed based on the stream buffer 41 (FIG. 2C). For example, the processor 140 may reduce, based on a stream stored in the stream buffer 41 being identified as less than a first threshold value, at least one from among the minimum value or the maximum value of VRR. In addition, the processor 140 may increase, based on a stream stored in the stream buffer being identified as exceeding a second threshold value, at least one from among the minimum value or the maximum value of VRR. For example, the first threshold value may be a minimum threshold value, and the second threshold value may be a maximum threshold value.

In an embodiment, the processor 140 may set the first threshold value and the second threshold value based on delay characteristic information of content. The delay characteristic information may be information identified based on a characteristic of content (or source content). For example, when classifying which type is the content that requires which delay characteristic, methods such as classifying according to an input source such as a gaming device/a set-top/a BDP and the like or using information stored in a content database (DB), or directly analyzing an image may be used. For example, because there can be parts that require low-latency and parts focused on viewing that do not require low-latency by the user directly playing even within one game content, a classification may change per chapter or scene. In an embodiment, the external server may identify delay characteristic information based on a characteristic of content (or source content). For example, the delay characteristic information may be information that show only whether there is a low-latency request, information in which an extent of low-latency request is quantified, or level information which rated the extent of low-latency request. That is, the delay characteristic information may be information of various types that can show the low-latency request of content.

For example, the processor 140 may raise, based on the delay characteristic information of content being identified as allowing a large delay, the second threshold value of the stream buffer, that is, the maximum threshold value (or allowable maximum value) and secure stability allowing for the large delay. Alternatively, the processor 140 may identify the first threshold value and/or the second threshold value of the stream buffer 41 taking into consideration not only the delay characteristic information of the content but also the network state. For example, if a change in network state is severe, the first threshold value and the second threshold value of the stream buffer 41 may both be set relatively largely. In addition, if it is a content having low-latency characteristics (i.e., a game content in which a response rate with the user is very important), the first threshold value and the second threshold value may both be set relatively small.

At operation S450, the processor 140 may transmit, based on at least one from among the minimum value or the maximum value of VRR being identified as needing a change (S440: YES), the available range information in which at least one from among the minimum value or the maximum value of VRR is changed based on at least one from among the state of the stream buffer or the network state to the external server.

Then, the processor 140 may receive and display the rendered image based on the changed available range information.

Figure 5:
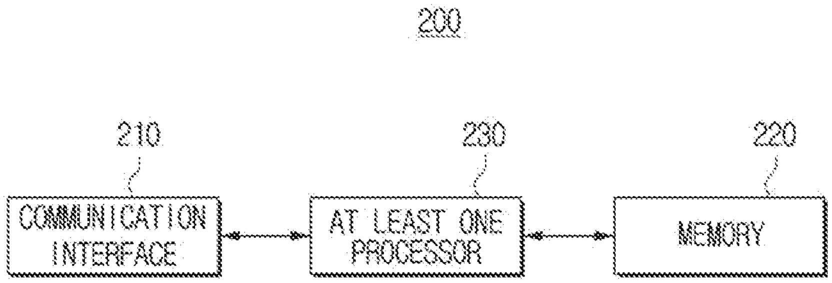
FIG. 5 is a diagram illustrating a configuration of a server apparatus according to one or more embodiments.

FIG. 5 is a diagram illustrating a configuration of a server apparatus according to one or more embodiments.

Referring to FIG. 5, a server apparatus 200 may include a communication interface 210, a memory 220, and at least one processor 230. In an embodiment, the server apparatus 200 may be implemented as the server apparatus 20 shown in FIG. 1.

According to an embodiment, the communication interface 210 may support various communication methods. For example, the communication interface 210 may perform communication with an external apparatus, for example, the display apparatus 100 through communication methods such as, for example, and without limitation, Bluetooth, an AP based Wi-Fi (e.g., Wi-Fi, wireless LAN network), ZigBee, a wired/wireless local area network (LAN), a wide area network (WAN), Ethernet, IEEE 1394, a high-definition multimedia interface (HDMI), and the like.

The memory 220 may store data necessary for one or more embodiments of the present disclosure. The memory 220 may be the same or similar to the memory 130 shown in FIG. 2A, and the detailed description thereof will be omitted.

The at least one processor 230 may control the overall operation of the server apparatus 200. Specifically, the at least one processor 230 may control the overall operation of the server apparatus 200 connected with each configuration of the server apparatus 200. For example, the at least one processor 230 may control the overall operation of the server apparatus 200 by being electrically connected with the memory 220. The at least one processor 230 may be formed of one or a plurality of processors. Because an embodiment of the at least one processor 230 is same or similar with the embodiment of the at least one processor 140 shown in FIG. 2A, the detailed description thereof will be omitted. For convenience of description, the at least one processor 230 may be referred to as a processor 230 below.

According to an embodiment, the server apparatus 200 may provide a cloud gaming service. For example, the server apparatus 200 may perform pre-processing such as compressing and optimizing in an appropriate media form to continuously transfer a game driving screen into a media format such as a scene of a moving image, and transmit a media file generated through the pre-processing to a client apparatus (e.g., display apparatus 100 in FIG. 2A). In this case, the media file received from an application end of the client apparatus may be played back and the cloud gaming service may be provided to the user. In addition, the server apparatus 200 may update the game driving screen based on a game play control of the user received from the client apparatus and transmit the updated game driving screen back to the client apparatus.

According to an embodiment, the server apparatus 200 may transmit images of various resolutions and various compressed images to the client apparatus. For example, the server apparatus 200 may transmit at least one image from among images with resolutions of greater than or equal to a standard definition (SD), a high definition (HD), a full high definition (FHD), or an ultra high definition (UHD). In addition, the server apparatus 200 may receive an image that is compressed using, for example, and without limitation, a moving picture experts group (MPEG) (e.g., MP2, MP4, MP7, etc.), a joint photographic coding experts group (JPEG), an advanced video coding (AVC), H.264, H.265, a high efficiency video codec (HEVC), VC-1, VP8, VP9, AOMedia Video 1 (AV1), and the like.

Figure 6:
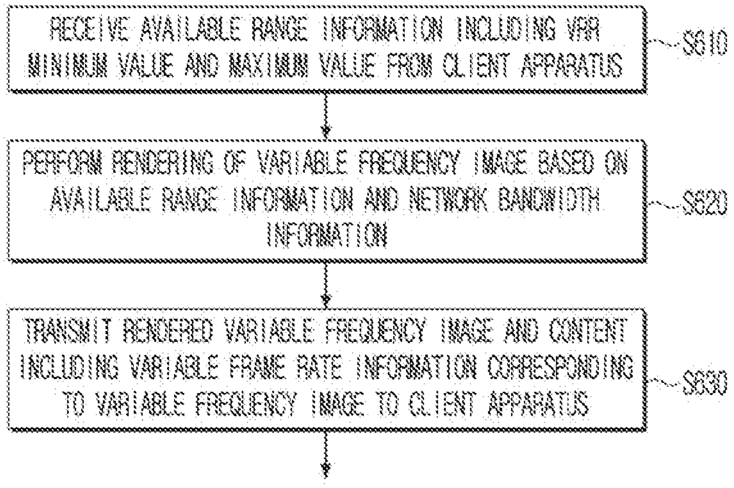
FIG. 6 is a diagram illustrating an operation of a server apparatus according to one or more embodiments.

FIG. 6 is a diagram illustrating an operation of a server apparatus according to one or more embodiments.

Referring to FIG. 6, at operation S610, the processor 230 may receive the available range information including the minimum value and the maximum value of VRR from a client apparatus (e.g., display apparatus 100 in FIG. 2A).

In an embodiment, the processor 230 may transmit, based on a game content request being received from the client apparatus, the signal verifying VRR operability to the client apparatus, and receive the available range information in response to the signal verifying VRR operability from the client apparatus. However, the above is not limited thereto, and the available range information may be received from the client apparatus together with the game content request, or receive the available range information that is continued from the game content request even if a separate signal verifying VRR operability is not transmitted to the client apparatus.

At operation S620, the processor 230 may perform rendering of the variable frequency image based on the available range information and the network bandwidth information received from the client apparatus.

At operation S623, the processor 230 may transmit content including the rendered variable frequency image and the variable frame rate information corresponding to the variable frequency image to the client apparatus. For example, the frame rate information may be included in the metadata, but is not necessarily limited thereto.

Figure 7:
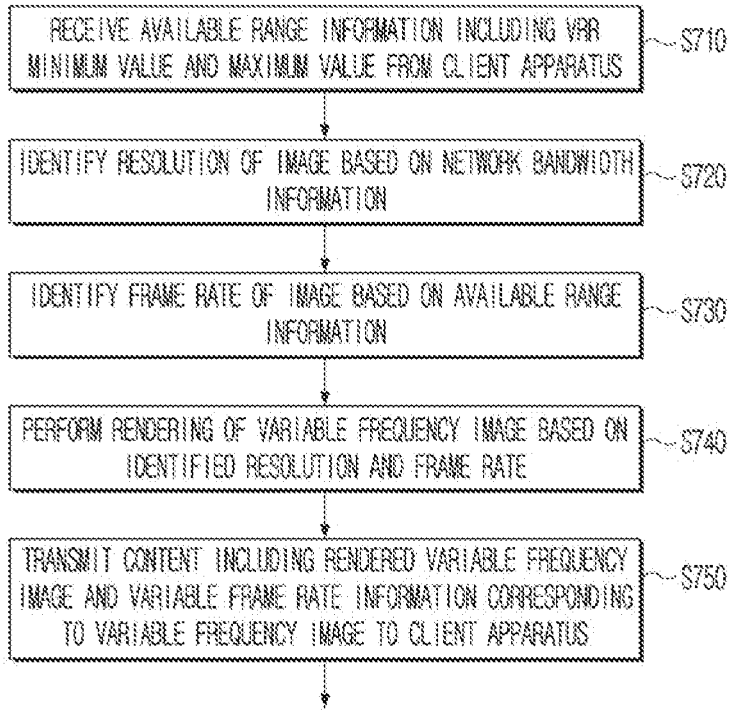
FIG. 7 is a diagram illustrating an operation of a server apparatus according to one or more embodiments.

FIG. 7 is a diagram illustrating an operation of a server apparatus according to one or more embodiments.

Referring to FIG. 7, at operation S710, the processor 230 may receive the available range information including the minimum value and the maximum value of VRR from the client apparatus.

In an embodiment, the processor 230 may transmit, based on the game content request being received from the client apparatus, the signal verifying VRR operability to the client apparatus, and receive the available range information as a response to the signal verifying VRR operability from the client apparatus. However, the above is not limited thereto, and the available range information may be received together with the game content request from the client apparatus, or the available range information that is continued from the game content request may be received even if the separate signal verifying VRR operability is not transmitted to the client apparatus.

At operation S720, the processor 230 may identify an image resolution based on the network bandwidth information. However, the processor 230 may also identify the image resolution based on the network state information which is different from the network bandwidth information. Here, the network state information may include at least one from among a packet loss rate, a round-trip time of a packet, a delay-gradient of a packet, received signal strength indicator (RSSI) information, communication channel information, link speed information, channel interference information, or retry rate information. That is, the network state information may be information associated with various networks that are affected according to the congestion, the distance, and the transmission rate of the network.

In an embodiment, the network state information may be received from the client apparatus. In this case, the client apparatus may collect the network state information by monitoring the network state and transmit the collected network state information to the server apparatus 200 at a pre-set cycle or at the request of the server apparatus 200. For example, if the network is implemented with an internet based TCP/IP communication protocol, the TCP/IP may be implemented with a link layer, an internet layer, a transport layer, and an application layer. In this case, the network state information may be collected by monitoring the network state in real-time from the application layer, but is not limited thereto. However, the server apparatus 200 may collect the network state information by monitoring the network state directly according to circumstance.

At operation S730, the processor 230 may identify a frame rate of the image based on the available range information. In an embodiment, the processor 230 may identify the frame rate of the image based on at least one from among a minimum value, a maximum value, an average value or a median value included in the available range information. For example, the frame rate of the image may be identified within an available range based on at least one from among a frequency of a user control command received from the client apparatus, the network state information, or the resolution information. For example, the processor 230 may perform rendering of the variable frequency image by varying the frame rate of the image within a range in which the resolution of the image identified in operation S720 is maintained.

However, according to another example, the processor 230 may identify the resolution and frame rate of the image taking into consideration both the available range information and the network state information. In an embodiment, the processor 230 may variably identify the resolution and frame rate of the image using a trained artificial intelligence model. Here, the artificial intelligence model being trained refers to a pre-defined operation rule or an artificial intelligence model set to perform a desired characteristic (or, object) being created as a basic artificial intelligence model (e.g., an artificial intelligence model including random parameters) being trained using a plurality of training data by a learning algorithm. The learning may be carried out through a separate server and/or a system, but is not limited thereto, and may be carried out in an electronic apparatus. Examples of the learning algorithm may include a supervised learning, an unsupervised learning, a semi-supervised learning, or a reinforcement learning, but is not limited to the above-described examples. Here, the artificial intelligence model may be implemented with, for example, and without limitation, a Convolutional Neural Network (CNN), a Recurrent Neural Network (RNN), a Restricted Boltzmann Machine (RBM), a Deep Belief Network (DBN), a Bidirectional Recurrent Deep Neural Network (BRDNN), or a Deep-Q Networks, but is not limited thereto.

In an embodiment, the trained artificial intelligence model may be trained, based on the available range information and the network state information being input, to output the resolution and frame rate of the image. For example, the trained artificial intelligence model may be trained to output an optimal combination of the resolution and frame rate based on the available range information and the network bandwidth information. For example, the resolution information may include resolutions such as a standard definition (SD), a high definition (HD), a full high definition (FHD), a quad high definition (QHD), a 4K ultra high definition (UHD), an 8K UHD, or greater. Accordingly, the information output from the trained artificial intelligence model may include one from among combinations of different resolutions and different frame rates such as (FHD, 50 Hz), (FHD, 60 Hz), (FHD, 120 Hz), . . . , (4K UHD, 50 Hz), (4K UHD, 60 Hz), (4K UHD, 120 Hz), . . . , (8K UHD, 50 Hz), (8K UHD, 60 Hz), (8K UHD, 120 Hz), etc.

At operation S740, the processor 230 may perform rendering of the variable frequency image based on the identified resolution and frame rate.

At operation S750, the processor 230 may transmit content which includes the rendered variable frequency image and the variable frame rate information corresponding to the variable frequency image to the client apparatus.

In an embodiment, the processor 230 may generate a packet (or frame) based on the encoded image, and transmit the generated packet to the client apparatus. In this case, the resolution information and the frame rate information may be included in the header area of the packet, and the encoded image may be included in the payload area of the packet. In an embodiment, the resolution and the frame rate may be changed to at least one frame unit, and the resolution and frame rate corresponding to the at least one frame unit may be included in the header of the packet.

In an embodiment, the processor 230 may perform rendering of the variable frequency image by varying the frame rate of the image while maintaining the resolution of the image based on the network bandwidth information.

For example, the processor 230 may improve the overall load by reducing a frame rate rendering process based on the available range information of the client apparatus and thereby reduce a delay according to a cloud game control input. For example, content streaming may be provided in a method of maintaining a resolution quality by reducing only the frame rate (e.g., 30 Hz, 50 Hz, 60 Hz, etc.) according to the network bandwidth information.

In an embodiment, the processor 230 may variably identify the frame rate of the variable frequency image within the available range which includes the minimum value and the maximum value of VRR based on the frequency of the user control command received from the client apparatus.

For example, the processor 230 may increase the frame rate when the frequency of the user control command is greater than or equal to a threshold frequency and reduce the frame rate when the frequency of the user control command is less than the threshold frequency. If the frequency of the user control command is greater than or equal to the threshold frequency, providing a smooth game screen may be possible if the frame rate is increased to correspond to the frequency of the user control command. However, if the frequency of the user control command is less than the threshold frequency, the frame rate may be reduced to reduce the overall load. Here, the threshold frequency may be a pre-set value that takes into consideration a display panel characteristic, and the like, but is not limited thereto, and may be changed according to the network state, or the like. According to the corresponding example, the overall load may be improved by varying the frame rate rendering process according to the frequency of the user control command and thereby, a delay according to the cloud game control input may be reduced.

Figure 8:
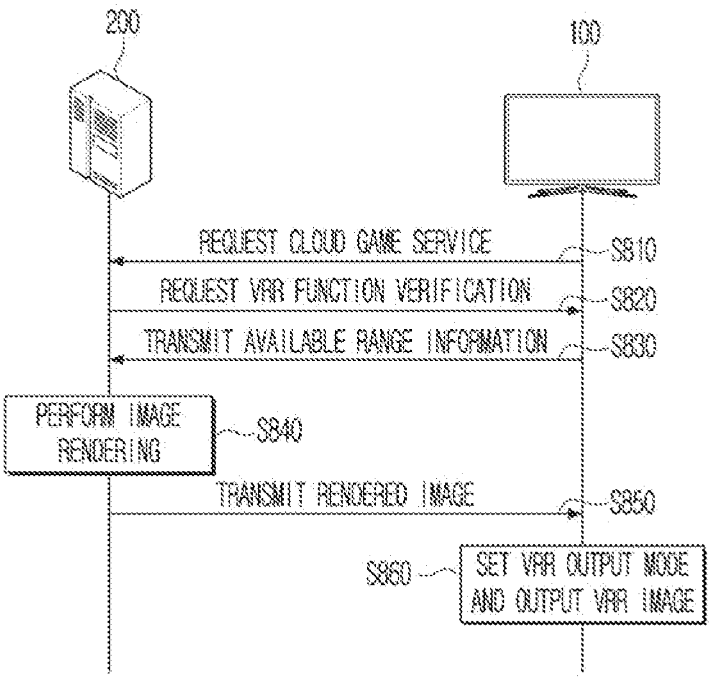
FIG. 8 is a sequence diagram illustrating a signal flow between a display apparatus and a server apparatus according to one or more embodiments.

FIG. 8 is a sequence diagram illustrating a signal flow between a display apparatus and a server apparatus according to one or more embodiments.

Referring to FIG. 8, at operation S810, the display apparatus 100 may request for the cloud gaming service, that is, the cloud game content to the server apparatus 200. For example, the user may connect to the server apparatus 200 that provides the cloud gaming service through the display apparatus 100.

At operation S820, the server apparatus 200 may transmit a VRR function verification request to the display apparatus 100. For example, the server apparatus 200 may request for whether VRR function support is possible by the display apparatus 100, and for the VRR available range information.

At operation S830, the display apparatus 100 may transmit, based on supporting a VRR function, the VRR available range information to the server apparatus 200 by responding to the VRR function verification request.

At operation S840, the server apparatus 200 may perform rendering of the image based on the VRR available range information received from the display apparatus 100. For example, the server apparatus 200 may identify the resolution of the image based on the network bandwidth information, and perform rending of the image by identifying the frame rate of the image based on the available range information.

At operation S850, the server apparatus 200 may transmit the rendered image to the display apparatus 100.

At operation S860, the display apparatus 100 may be set in the VRR output mode and output a VRR image received from the server apparatus 200. For example, the display apparatus 100 may be implemented so as to support a plurality of output modes, such as, a variable refresh rate (VRR) output mode, a frame rate control (FRC) output mode, and a normal output mode. In this case, the display apparatus 100 may be set in the VRR output mode if the VRR image is identified as to be transmitted from the server apparatus 200. For example, the display apparatus 100 may be set in the VRR output mode based on information included in the info frame included in the content received from the server apparatus 200. For example, the info frame may include information showing that the variable frequency image can be transmitted, and may be transmitted through a portion of the area of the image frame. However, according to another example, a separate signal for setting the VRR output mode may be transmitted to the display apparatus 100 prior to the VRR image being transmitted from the server apparatus 200 to the display apparatus 100.

According to the various example embodiments described above, transmission delay may be minimized while content quality is maintained according to the network state and/or display characteristics in a low-latency streaming service such as a cloud gaming service. In addition, because a frame rate or a refresh rate between the server and the client is different, stuttering, tearing and the like that can be generated may be minimized.

The methods according to the various embodiments of the disclosure described above may be implemented in an application form installable in a display apparatus of the related art. Alternatively, the methods according to the various embodiments of the disclosure described above may be performed using a deep learning based artificial neural network (or deep artificial neural network), that is, a learning network model. In an embodiment, at least one from among downscaling, decoding, encoding, and upscaling may be performed through the trained neural network model.

In addition, the methods according to the various embodiments of the disclosure described above may be implemented with only a software upgrade or a hardware upgrade of the display apparatus of the related art.

In addition, the various embodiments of the disclosure described above may be performed through an embedded server provided in the display apparatus, or an external server of the display apparatus.

The various example embodiments of the present disclosure described above may be implemented with software including instructions stored in a machine-readable storage media (e.g., computer). The machine may call an instruction stored in the storage medium, and as a device operable according to the called instruction, may include a display apparatus according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

A method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, each of the elements (e.g., a module or a program) according to the various embodiments described above may be formed as a single entity or a plurality of entities, and some sub-elements from among the above-mentioned sub-elements may be omitted, or other sub-elements may be further included in the various embodiments. Alternatively or additionally, some elements (e.g., modules or programs) may be integrated into one entity to perform the same or similar functions performed by the respective elements prior to integration. Operations performed by a module, a program, or another element, in accordance with various embodiments, may be executed sequentially, in a parallel, repetitively, or in a heuristic manner, or at least some operations may be executed in a different order, omitted or a different operation may be added.

While various example embodiments of the disclosure have been illustrated and described, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display apparatus, comprising:

a communication interface;

a display;

a memory storing at least one instruction; and at least one processor operatively connected with the communication interface, the display, and the memory, wherein the at least one processor is configured to execute the at least one instruction to:

transmit, through the communication interface, available range information to an external server, the available range information comprising a minimum refresh rate and a maximum refresh rate of a variable refresh rate (VRR), receive content from the external server, through the communication interface, the content comprising a variable frequency image rendered based on the available range information, network bandwidth information, and variable frame rate information that corresponds to the variable frequency image, and control, based on the received content, the display to display the variable frequency image based on the variable frame rate information, wherein the at least one processor is further configured to execute the at least one instruction to:

identify at least one of the minimum refresh rate or the maximum refresh rate needing change, based on at least one of a stream buffer state or a network state; and transmit adjusted available range information to the external server, the adjusted available range information comprising at least one of a changed minimum refresh rate or a changed maximum refresh rate, wherein the at least one processor is further configured to execute the at least one instruction to:

identify, based on a stream stored in the stream buffer being identified as less than a first threshold value, at least one of the minimum refresh rate or the maximum refresh rate needing reduction and identify, based on the stream stored in the stream buffer being identified as exceeding a second threshold value, at least one of the minimum refresh rate or the maximum refresh rate increase.

2. The display apparatus of claim 1, wherein the at least one processor is further configured to execute the at least one instruction to:

control the display to be set in a VRR output mode based on an info frame in the received content.

3. The display apparatus of claim 1, wherein the external server is configured to provide a cloud gaming service, and the at least one processor is further configured to execute the at least one instruction to:

transmit a request for a game content to the external server;

receive a signal verifying VRR operability, from the external server, based on the request for the game content; and transmit the available range information to the external server based on the signal verifying VRR operability.

4. The display apparatus of claim 1, wherein the at least one processor is further configured to execute the at least on instruction to:

control the display to display the variable frequency image in a first frequency at a first time, based on the variable frame rate information; and control the display to display the variable frequency image in a second frequency at a second time, based on the variable frame rate information.

5. A server apparatus, comprising:

a communication interface;

a memory storing at least one instruction; and at least one processor operatively connected with the communication interface and the memory, wherein the at least one processor is configured to execute the at least one instruction to:

receive, through the communication interface, available range information from a client apparatus, the available range information comprising a minimum refresh rate and a maximum refresh rate of a variable refresh rate (VRR), render a variable frequency image based on the available range information and network bandwidth information, and transmit content to the client apparatus, through the communication interface, the content comprising the rendered variable frequency image, and variable frame rate information corresponding to the variable frequency image, receive, through the communication interface, adjusted available range information from the client apparatus, the adjusted available range information comprising at least one of a changed minimum refresh rate or a changed maximum refresh rate, render an adjusted variable frequency image based on the adjusted available range information and network bandwidth information, and transmit content to the client apparatus, through the communication interface, the content comprising the rendered adjusted variable frequency image, and variable frame rate information corresponding to the adjusted variable frequency image.

6. The server apparatus of claim 5, wherein the at least one processor is further configured to execute the at least one instruction to:

identify a resolution to render the variable frequency image, based on the network bandwidth information;

identify a frame rate to render the variable frequency image, based on the available range information; and render the variable frequency image based on the identified resolution and the identified frame rate.

7. The server apparatus of claim 6, wherein the at least one processor is further configured to execute the at least one instruction to:

render the variable frequency image by varying the frame rate while maintaining the resolution, based on the network bandwidth information.

8. The server apparatus of claim 5, wherein the at least one processor is further configured to execute the at least one instruction to:

identify a frame rate of the variable frequency image within an available range comprising the minimum refresh rate and the maximum refresh rate of VRR, based on a frequency of a user control command received from the client apparatus.

9. The server apparatus of claim 5, wherein the server apparatus is configured to provide a cloud gaming service, and the at least on processor is further configured to execute the at least one instruction to:

receive, from the client apparatus, a request for a game content;

transmit, to the client apparatus, a signal verifying VRR operability based on the request for the game content;

receive available range information from the client apparatus, based on the signal verifying VRR operability.

10. A method of controlling a display apparatus, comprising:

transmitting available range information to an external server, the available range information comprising a minimum refresh rate and a maximum refresh rate of a variable refresh rate (VRR);

receiving content from the external server, the content comprising a variable frequency image rendered based on the available range information, network bandwidth information, and variable frame rate information that corresponds to the variable frequency image; and outputting the variable frequency image on a display, based on the variable frame rate information, identifying whether at least one of the minimum refresh rate or the maximum refresh rate needs to be changed, based on at least one of a stream buffer state or a network state; and transmitting adjusted available range information to the external server, based on identifying that at least one of the minimum refresh rate or the maximum refresh rate needs to be changed, the adjusted available range information comprising at least one of a change minimum refresh rate and a changed maximum refresh rate, wherein identifying whether at least one of the minimum refresh rate or the maximum refresh rate needs to be changed comprises;

identifying, based on a stream stored in the stream buffer being identified as less than a first threshold value, at least one of the minimum refresh rate or the maximum refresh rate needs to be reduced and identifying, based on the stream stored in the stream buffer being identified as exceeding a second threshold value, at least one the minimum refresh rate or the maximum refresh rate needs to be increased.

11. The method of claim 10, further comprising:

setting the display to a VRR output mode based on an info frame in the received content.

12. The method of claim 10, wherein the external server is configured to provide a cloud gaming service, and wherein the transmitting the adjusted available range information to the external server comprises:

transmitting a request for a game content to the external server;

receiving a signal verifying VRR operability from the external server, based on the request for the game content;

transmitting the adjusted available range information to the external server, based on the signal verifying VRR operability.

13. A method of controlling a server apparatus, the method comprising:

receiving available range information from a client apparatus, the available range information comprising a minimum refresh rate and a maximum refresh rate of a variable refresh rate (VRR);

rendering a variable frequency image based on the available range information and network bandwidth information;

transmitting content to the client apparatus, the content comprising the rendered variable frequency image and variable frame rate information corresponding to the variable frequency image, receiving adjusted available range information from the client apparatus, the adjusted available range information comprising at least one of a changed minimum refresh rate or a changed maximum refresh rate, rendering an adjusted variable frequency image based on the adjusted available range information and network bandwidth information, and transmitting content to the client apparatus, the content comprising the rendered adjusted variable frequency image, and variable frame rate information corresponding to the adjusted variable frequency image.

14. The method of claim 13, further comprising:

identifying a resolution to render the variable frequency image, based on the network bandwidth information;

identifying a frame rate to render the variable frequency image, based on the available range information; and rendering the variable frequency image based on the identified resolution and the identified frame rate.

15. The method of claim 14, further comprising:

rendering the variable frequency image by varying the frame rate while maintaining the resolution, based on the network bandwidth information.

16. The method of claim 13, further comprising:

receiving, from the client apparatus, a request for a game content;

transmitting, to the client apparatus, a signal verifying VRR operability based on the request for the game content; and receiving available range information from the client apparatus, based on the signal verifying VRR operability.

17. The method of claim 13, further comprising:

receiving, from the client apparatus, adjusted available range information, the adjusted available range information comprising at least one of a changed minimum refresh rate or a changed maximum refresh rate of the VRR; and rendering the variable frequency image based on the adjusted available range information and the network bandwidth information, wherein the variable frequency image is rendered in a first frequency at a first time based on the available range information and the network information, and the variable frequency image is rendered in a second frequency at a second time based on the adjusted available range information and the network information.

18. A non-transitory computer readable medium for storing computer readable program code or instructions which are executable by a processor to perform a method for controlling a server apparatus, the method comprising:

receiving available range information from a client apparatus, the available range information comprising a minimum refresh rate and a maximum refresh rate of a variable refresh rate (VRR);

rendering a variable frequency image based on the available range information and network bandwidth information;

transmitting content to the client apparatus, the content comprising the rendered variable frequency image and variable frame rate information corresponding to the variable frequency image, receiving adjusted available range information from the client apparatus, the adjusted available range information comprising at least one of a changed minimum refresh rate or a changed maximum refresh rate, rendering an adjusted variable frequency image based on the adjusted available range information and network bandwidth information, and transmitting content to the client apparatus, the content comprising the rendered adjusted variable frequency image, and variable frame rate information corresponding to the adjusted variable frequency image.

* * * * *